Nov. 15, 1955
W. A. CALDWELL
2,723,700
RELIEF VALVE AND PRESSURE SIGNAL
FOR PNEUMATIC TIRES
Filed March 18, 1954
2 Sheets-Sheet 1
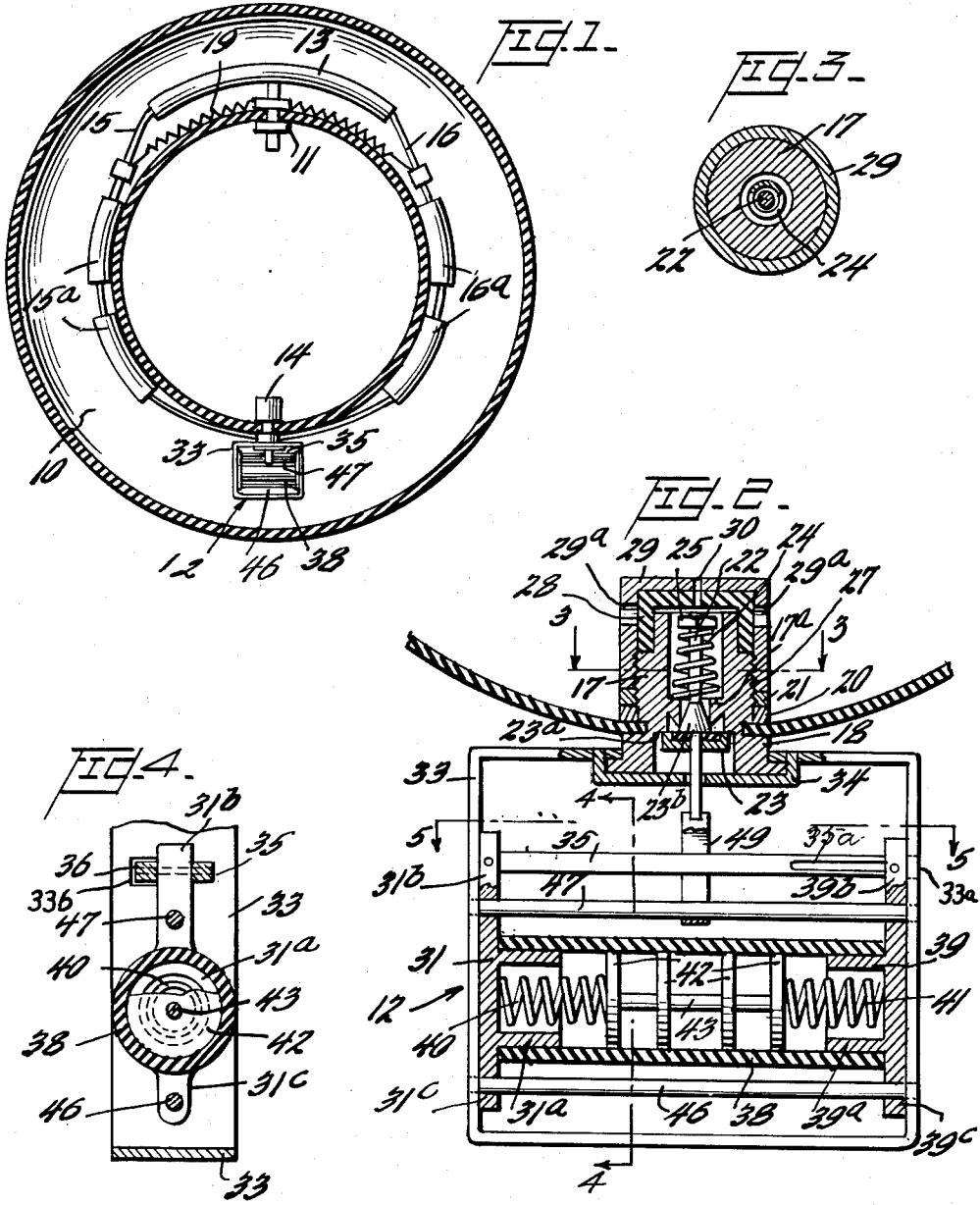
William A. Caldwell
INVENTOR Nov. 15, 1955
W. A. CALDWELL
2,723,700
RELIEF VALVE AND PRESSURE SIGNAL
FOR PNEUMATIC TIRES
Filed March 18, 1954
2 Sheets-Sheet 2
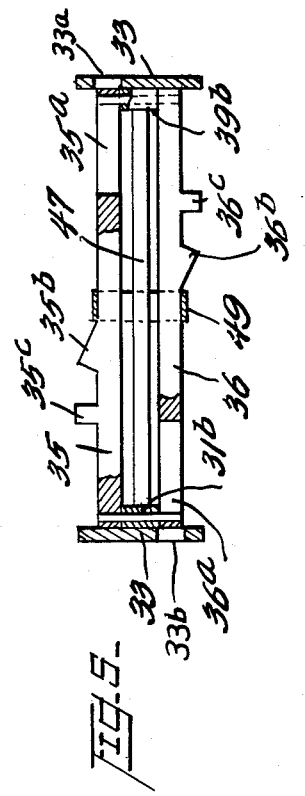
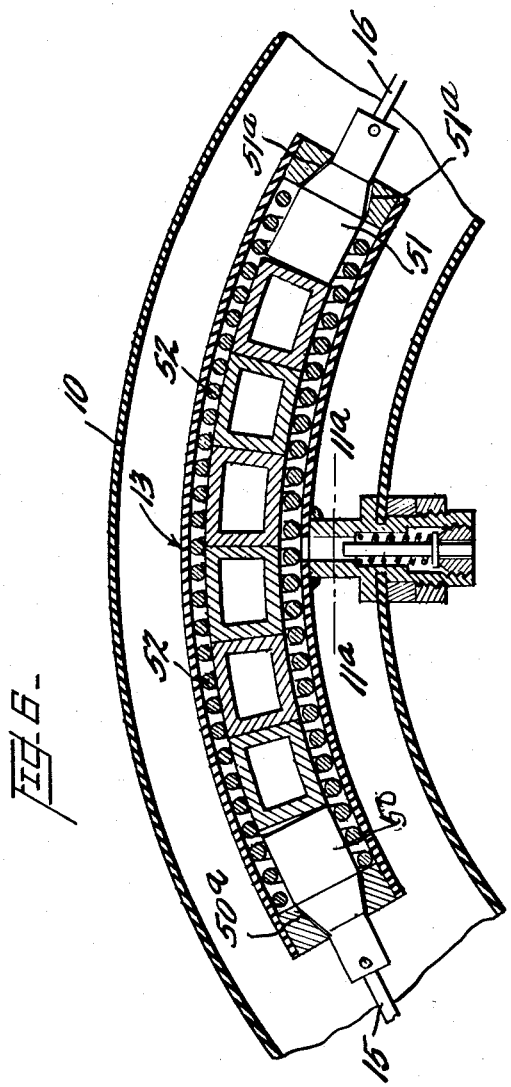
William A. Caldwell
INVENTOR

United States Patent Office 2,723,700
Patented Nov. 15, 1955

2,723,700

RELIEF VALVE AND PRESSURE SIGNAL FOR PNEUMATIC TIRES

William Addison Caldwell, Leesburg, Tex.

Application March 18, 1954, Serial No. 417,019

3 Claims. (Cl. 152—418)

This invention relates to pneumatic tires for vehicles. It has for its object to provide certain improvements in the construction of such tires, particularly the inner tube, primarily for the purpose of protecting the tires against excessive pressure at the time of inflation as well as in the course of ordinary operation.

A second purpose served by the invention is to provide an audible warning signal of a dangerous increase or decrease of pressure in the tire over or below the usual operating pressure.

To accomplish the aforesaid purposes, I provide a new type of relief valve mechanism for the inner tube located exteriorly thereto and operated by a power member located within the tube which in turn is operated by changes of air pressure therein, adapted to determine automatically the amount of air pressure that can be and should be initially injected into the tube; to release excessive pressure from the tube caused by excessive heat created by the usual operational hazards; to give timely warning by means of an audible signal of any unusual increase or decrease of pressure in the tube due to any cause whatever in the course of ordinary operation; and when used conjointly with a pressure and temperature equilibrator or automatic inflation pump to cooperate with it in the circulation of air through the tube.

To these and other ends, my invention comprises other improvements and advantages as will be fully described in the accompanying specification, the novel features thereof being set forth in the appended claims.

In the drawings:

Figure 1 is a vertical section of an inflated inner tube, in which the several elements of my invention are illustrated as they appear in elevation.

Figure 2 is an enlarged vertical section of the relief valve and power member taken on the same sectional plane as that of Figure 1.

Figure 3 is a cross section of the nipple of the relief valve taken on the line 3—3 of Figure 2.

Figure 4 is a cross section of the power member taken on the line 4—4 of Figure 2.

Figure 5 is a lengthwise section of a pair of lug carrying rods 35, 36.

Figure 6 is a vertical section of the air inlet valve, long in general use, also shown associated with an automatic tire pump. When used independent of the automatic pump, the inlet valve terminates at the dotted line 11a—11a.

Similar reference numerals in the several figures indicate similar parts.

In illustrating my invention, I have shown in Figure 1 only the air chamber or inner tube 10 of a pneumatic tire, which when inflated assumes the shape of a circular tube, which is also circular in cross section. At one point in the inner circumference of the inner tube, there is fixed externally the relief valve 14, and the associated internally located power member 12. Oppositely disposed within the tube is a pressure and temperature equilibrator or automatic tire pump indicated by the numeral 13, which intermediate its ends is connected to the tube 10 by a nipple 11 having a valve controlled air inlet opening exteriorly to the tube. The valves 50—50a and 51—51a located interiorly in the ends of the body of the automatic pump have their heads connected by the flexible rod 15—16 also located in the tube 10; and the inner ends of the heads are connected by the extension coil spring 52 which spaces the said heads and normally holds the valves open, thereby placing the body of the automatic pump normally in open communication with the interior of the inner tube. The rod 15—16 carries multiple weights 15a, 16a, which upon rotation of the wheel carrying the tire are displaced by centrifugal force, that is transmitted to the automatic pump by the said rod initially through the spring 19.

The specially constructed relief valve shown in Figure 2 comprises a nipple 17 having at its radially outer end a flange 18 which engages the inner face of the tube 10, the nipple passing outward through a suitable aperture cut in the wall of the inner tube. The material of the tube surrounding the aperture is clamped against the flange 18 by a collar 20 and a compression nut 21.

There is a valve stem 22 centrally located in the nipple 17 carrying a head 23 provided with a rubber pad which is normally closed against the valve seat 23a by a compression spring 24. The upper end of the spring engages a nut 25 threaded onto the valve stem 22, and the lower end engages a shoulder 17a cut in the walls of the valve nipple. The nut 25 also serves to adjust the tension of the spring 24.

Extending upwardly from the valve head 23 is a conical projection 23b removably secured to the stem 22 which being of lesser diameter than the valve seat opening, performs the dual purpose of securing the rubber pad in the valve head at the same time restricting the opening in the valve seat when the head is but slightly disengaged from the valve seat.

A rubber cap 28 is stretched over the top of the nipple 17 and is enclosed by a retaining closure 29 which engages the threads 27. In line with the valve stem, both the rubber cap and the closure are provided with small alined perforations 30, and in the sides of the closure 29 are round apertures 29a. The perforations are for the purpose of permitting small quantities of air to escape on occasions when the valve head 23 is but partially disengaged from the seat 23a; and the apertures are for the purpose of permitting large quantities of air to escape when the said head has been retracted sufficiently to disengage the projection 23b from the opening in the valve seat 23a. A large quantity of air in escaping in the manner described will rupture the side walls of the rubber cap 28 with a loud report that will serve as an audible signal.

Associated with the relief valve and disposed at right angles thereto within the air chamber 10 of the tire is a power member 12 comprising parts which are actuated by changes in the air pressure in the chamber 10 adapted to open the valve. The two head pieces of this element 31, 39 have horizontally projecting annular collars 31a, 39a, to which is attached a short piece of rubber tubing 38. This tube is compressible lengthwise only, being braced against collapsing under air pressure by compression coil springs 40, 41 and a series of discs 42 formed integrally on a central stem 43, which discs also serve to adapt the rubber tube 38 to fold bellows-like under air pressure. The head pieces 31, 39 of this longitudinally compressible member 38 are provided with vertically projecting rectangular arms 31b—31c and 39b—39c by means of which the head pieces are slidably mounted on rods 46, 47 in the rectangular cage 33, so that when the rubber member 38 is compressed the heads move towards each other.

Also to the arms 31b, 39b is bolted one end of each of the lug carrying rods 35, 36, respectively. The free ends of these rods are guided for horizontal movement on the protracted heads of the said bolts by means of grooves 35a, 36a passing through slots 33a, 33b provided for that purpose.

The top side of the metal cage 33 is severed midway, and the ends of the segments are annular shaped to fit in a groove cut in the flange 18 of the base 17 of the valve nipple. The two segments are bound together by the cleat 34 which is provided with a hole at its middle center to allow the passage of the valve stem 22.

A pliable band 49 is slidably mounted by a hole in its middle center on the radially outward end of the valve stem 22. The ends of the band after encircling the lug carrying rods 35, 36, are fastened to the rod 47 at its midportion. The lugs 35b, 36b have their sides adjacent to the band 49 sloped more than the other sides so that when moved inwardly by the compression of the rubber member 38, they will slide past the sides of the band. After the sides of the band 49 have been slid past by the lugs 35b, 36b, they will engage the projections 35c, 36c on the lug carrying rods adjacent to the lugs, thereby disengaging the valve head 23 from its seat 23a. Also when by the expansion of the rubber member 38, the lugs are subsequently moved outwardly, they will engage the sides of the band 49 sufficiently to disengage the valve head 23 from its seat as more fully hereinafter explained in the operational guide.

The operation of my invention is as follows:

Beginning with an empty tire, the air pump or tank is connected to the nipple of the air inlet valve 11, which is adapted to admit air under pressure into the inner tube 10, whether used independently or associated with a pressure and temperature equilibrator, or automatic tire pump. As air is injected into the inner tube 10, the increasing air pressure will compress the rubber element 38 of the power member 12, thereby forcing the heads of the said element inwardly until the lugs 35b, 36b slide past the sides of the band 49, when the projections 35c, 36c will engage the sides of the said band, and disengage the valve head 23 from its seat 23a, after which it will be impossible to further inflate the tire, for air will escape through the relief valve 14 as fast as it is injected through the inlet valve 11.

In the same manner, excess pressure in the tire caused by heat or atmospheric changes will be reduced by the escape of air through the relief valve.

After the tire has been duly inflated to its normal operating limit, predetermined by the power member 12 in the manner above described, any loss of pressure by leakage will cause the heads of the power member to move outwardly, when the slightly tapered sides of the lugs 35b, 36b will engage the sides of the band 49, and thereby disengage the valve head 23 from its seat, whereupon air will escape from the inner tube 10 through the relief valve when completely opened, in sufficient quantity to rupture the rubber cap 28 audibly. Air will continue to escape through the relief valve after the rubber cap has been ruptured until the bottom of the valve head 23 engages the cleat 34, when the lugs 35b, 36b will be forced to release their hold on the sides of the band 49, thus allowing the spring 24 and the valve head 23 to regain their normal positions and close the valve, thereby preventing the needless loss of air after the warning signal has been sounded.

Any increase of pressure in the tire above the normal operating point generally will but partially open the valve 23, and the air thereby released will be discharged through the perforation 30 in the rubber cap 28; while the loss of pressure because of a continuous leak will invariably open the valve completely and release air in excess of the capacity of the perforation to discharge it, consequently it will rupture the rubber cap 28 and escape through the apertures 29a in the retaining closure 29.

I claim:

1. A relief valve for pneumatic tires comprising a hollow nipple with a flanged base adapted to penetrate the inner circumferential wall of the tire with which it may be associated and to be fastened thereto at a point diametrically opposite a customary inlet valve provided for the tire, a valve head engaging a valve seat closing the radially outer end of the nipple, a stem projecting both radially inwardly and outwardly from the center of the valve head, a conical projection threaded on to the valve stem binding a rubber pad to the radially inner surface of the valvehead and restricting the opening in the valve seat, a compression spring embracing the radially inner end of the valve stem with one end engaging a nut threaded on to the end of the stem and the other end engaging a shoulder cut in the walls of the nipple normally holding the valve closed, a rectangular cage adapted to be disposed within the tire at right angles to the nipple and to be fastened by its radially inner side to the flanged base of the nipple, a power member disposed in a horizontal position between the ends of the cage comprising two relatively movable heads slidably mounted on two rods extending between and fastened to the ends of the rectangular cage, one above and the other below the power member, said power member being capable of contracting and expanding with changes of air pressure in the tire to vary the position of its movable parts with reference to a pliable band slidably fastened at its midcenter on to the end of the stem projecting radially outwardly from the valve head through a hole in the middle center of a cleat fastened to the top side of the cage, the said band connecting the valve stem to the nearest of the two rods on which the movable heads of the power member are mounted, means comprising a compound lug suitably constructed, shaped, and placed one on each of two carrying rods operated back and forth between the sides of the band and cooperating with it operated by the movements of the said heads and cooperating with the said band to disengage the valve head from its seat upon the development of an excessive pressure of air in the tire or a substantial loss of air pressure therefrom, and an audible signal attached to the top of the nipple of the relief valve actuated by air escaping from the inner tube when the head of the valve is disengaged from its seat in the manner above described.

2. A relief valve for pneumatic tires comprising a hollow nipple with a flanged base adapted to penetrate the inner circumferential wall of the tire with which it may be associated and to be fastened thereto at a point diametrically opposite a customary inlet valve provided for the tire, a valve head engaging a valve seat closing the radially outer end of the nipple, a stem projecting both radially inwardly and outwardly from the head closing the opening in the valve seat, a conical projection threaded on to the valve stem binding a rubber pad to the radially inner surface of the valve head and restricting the opening in the valve seat, a compression spring embracing the radially inner end of the valve stem with one end engaging a nut threaded on to the end of the stem and the other end engaging a shoulder cut in the walls of the nipple normally holding the valve closed, which spring is set in accordance with a given air pressure, a rectangular cage adapted to be disposed within the tire at right angles to the nipple and to be fastened by its radially inner side to the flanged base of the nipple, a power member disposed in a horizontal position between the ends of the cage comprising two relatively movable heads slidably mounted on two rods extending between and fastened to the ends of the rectangular cage, one rod above and the other below the power member, the said power member further comprising a flexible tube having its ends fastened to the movable heads, a compression spring divided into two segments with multiple discs integrally formed on a central stem interposed between the two segments of the spring disposed in the flexible tube between the two movable heads, the spring being set to hold the heads spaced in accordance with a given air pressure in the tire, said power member being capable of contracting and expanding with changes of air pressure in the tire to vary the position of the movable parts with reference to a pliable band slidably fastened at its midcenter on to the end of the stem projecting radially outward from the valve head through a hole in the middle center of a cleat fastened to the radially inner side of the cage, the said band connecting the valve stem to the radially innermost of the two rods on which the movable heads of the power member are mounted, means comprising a compound lug suitably constructed, shaped, and placed one on each of two carrying rods operated back and forth between the sides of the band and cooperating with it operated by the movements of the said heads and cooperating with the said band to disengage the valve head from its seat upon the development of an excessive pressure of air in the tire or a substantial loss of air pressure therefrom, and an audible signal comprising a sheath enclosing the radially inner end of the valve nipple capable of rupture having an air vent in its top to protect it against rupture by a small quantity of air under pressure escaping from the tire through the valve nipple, a retaining closure having an air vent in alinement with the one in the sheath and apertures in its sides to allow the rupture of the sheath by air under pressure escaping from the tire through the valve nipple in excess of the capacity of the air vent to discharge it.

3. A relief valve for pneumatic tires comprising a hollow nipple with a flanged base adapted to penetrate the inner circumferential wall of the tire with which it may be associated and to be fastened thereto at a point diametrically opposite a customary inlet valve provided for the tire, a valve head engaging a valve seat closing the radially outer end of the nipple, a stem projecting both radially inwardly and outwardly from the center of the valve head, a conical projection threaded on to the valve stem binding a rubber pad to the radially inner surface of the valve head and restricting the opening in the valve seat, a compression spring embracing the radially inner end of the valve stem with one end engaging a nut threaded on to the end of the stem and the other end engaging a shoulder cut in the walls of the nipple normally holding the valve closed, which spring is set in accordance with a given air pressure, a rectangular cage adapted to be disposed in the tire at right angles to the nipple, a power member disposed in a horizontal position between the ends of the cage comprising two relative movable heads slidably mounted on two rods extending between and fastened to the ends of the rectangular cage, one above and the other below the power member, said power member being capable of contracting and expanding with changes of air pressure within the tire to vary the position of its movable parts with reference to a pliable band slidably fastened at its midcenter on to the end of the stem projecting radially outwardly from the valve head through a hole in the middle center of a cleat fastened to the radially inner side of the cage, the said band connecting the valve stem to the radially innermost of the two rods on which the movable heads of the power member are mounted, two additional rods running between the sides of the band with opposite ends fastened by bolts to the movable heads above the rod to which the band is fastened and the free ends guided by grooves on the said bolts, a lateral lug integrated with each of the rods disposed on opposite sides of the band adapted to slide past the band when the heads of the power member move towards each other and to engage the band when the said heads move in the opposite direction, a rectangular lateral projection also integrated with each of the rods disposed behind the lugs and adjacent thereto, the said rods with their lugs and projections cooperating with the band to disengage the valve head from its seat upon the development of an excessive pressure in the tire or a substantial loss of air pressure therefrom, and an audible signal attached to the top of the nipple of the relief valve actuated by air escaping from the tire when the head of the valve is disengaged from its seat in the manner above described.

References Cited in the file of this patent
UNITED STATES PATENTS 2,549,571    Caldwell _____ Apr. 17, 1951